United States Patent Office 3,092,649
Patented June 4, 1963

3,092,649
THIOPHOSPHORIC ACID ESTERS AND PROCESS FOR THEIR PRODUCTION
Gerhard Schrader, Wuppertal-Cronenberg, Germany, assignor to Farbenfabriken Bayer Aktiengesellschaft, Leverkusen, Germany, a corporation of Germany
No Drawing. Filed Aug. 31, 1960, Ser. No. 53,072
Claims priority, application Germany Sept. 5, 1959
6 Claims. (Cl. 260—461)

The present invention relates to and has as its objects new and useful thiophosphoric acid esters and processes for their production. The new compounds of the present invention may be represented by the following general formula

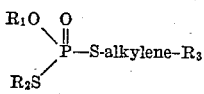

wherein $R_1$ and $R_2$ represent lower alkyl groups and $R_3$ represents a secondary amino group, an alkoxy- or aminocarbonyl groups, a cyano-group, an aryl residue or another

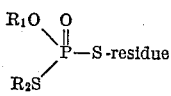

and wherein the alkylene group may also be interrupted by hetero atoms.

In accordance with the present invention it has been found that these thiophosphoric acid esters having the above general formula can be obtained by reacting appropriate O.S-dialkyl-thiolphosphoric acid salts with appropriately substituted alkyl halides.

As examples of halogen alkyl compounds within the scope of the present invention there may be mentioned the following, without, however, limiting the present invention thereto:

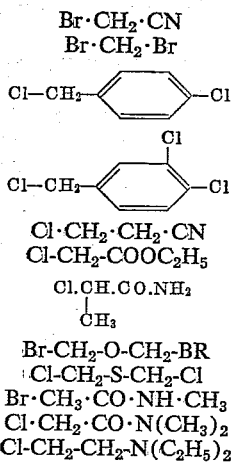

The O.S-dialkyl-thiolphosphoric acid salts also required as starting materials can conveniently be obtained according to the instructions by P. S. Pischtschimuka (J. Russ. Phys. Chem. Soc. 44 (1912), 1406–1554). It is not necessary to isolate the stated O.S-dialkyl-thiolphosphoric acid salts, but to convert directly the reaction products of O.O.S-trialkyl-thionophosphates with alkyl mercaptides with the above-stated halogen alkyl compounds.

The novel compounds obtainable according to the present invention also possess good systemic activity in addition to strong contact-insecticidal properties. They are intended for application to plant protection, and are employed in the manner and by methods known for phosphorus compounds.

The new compounds of the present invention very effectively kill insects like flies, mites, aphids, etc. They distinguish themselves especially by a good contact-insecticidal activity and at the same time by an activity against eating insects such as caterpillars. They may be used in the same manner as other known phosphoric acid insecticides, i.e. in a concentration from about 0.00001% to about 1%, diluted or extended with suitable solid or liquid carriers or diluents. Examples of such carriers are talc, chalk, bentonite, clay and the like, as liquid carriers there may be mentioned water (if necessary with commercial emulsifiers, alcohols, especially lower alcohols, such as methanol or ethanol, ketones, especially lower ketones, such as acetone, or methyl ethyl ketone, liquid hydrocarbons and the like. The new compounds may furthermore be used in combination with each other or with known insecticides, fertilizers, etc.

As examples for the special utility of the inventive compounds the compounds of the following formulae

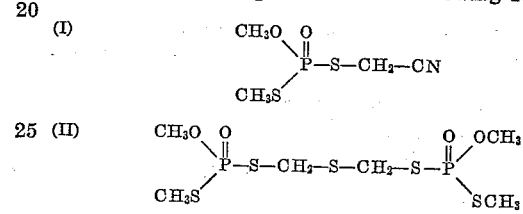

have been tested against aphids and caterpillars. Aqueous solutions of the aforementioned compounds have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The tests have been carried out as follows:

(a) Against aphids (contact-insecticidal action) of the type Doralis fabae. Heavily infested bean plants (Vicia faba) have been sprayed drip wet with solutions as prepared above. The effect has been determined by evaluation after 24 hours by counting the dead pests either on the surface of the soil or still remaining on the plants. The following results have been obtained:

| Compound | Aqueous concentration (in percent active ingredient/water) | Killing rate (in percent) |
|---|---|---|
| (I) | 0.01 | 100 |
| (II) | 0.01 | 100 |

(b) Against caterpillars of the type diamond back moth (Plutella maculipennis). White cabbage has been sprayed drip wet with aqueous emulsions as prepared above in a concentration as shown below. Caterpillars (10 each) have been placed on the sprayed leaves of the white cabbage. The living status of the caterpillars has been determined after 24 hours and 48 hours. The following results have been obtained:

| Compound | Aqueous concentration (in percent active ingredient/water) | Killing rate (in percent) |
|---|---|---|
| (I) | 0.1 | 100 |
| (II) | 0.1 | 100 |

The following examples are given for the purpose of illustrating the present invention:

Example 1

$$\begin{array}{c}C_2H_5O\\ \phantom{C_2H_5O}\diagdown\phantom{O}\\ \phantom{C_2H_5O}P-S-CH_2-CN\\ \phantom{C_2H_5O}\diagup\\ C_2H_5S\end{array}\quad\begin{array}{c}O\\ \|\\ \end{array}$$

54 grams (0.25 mol) of O.O.S-triethyl-thionophosphate (B.P. 86° C./2 mm. Hg) are added dropwise, with stirring, to a solution of 25 grams of potassium ethyl mercaptide in 100 ml. of anhydrous alcohol. The mixture is heated to 80° C. for one hour. The potassium salt of O.S-diethyl-thiolphosphoric acid is now present. To the resulting solution, 19 grams of α-chloro-acetonitrile are added dropwise at 40° C. with further stirring. The reaction product is stirred at 40–45° C. for one hour and then placed into 200 ml. of ice-water. The separated oil is taken up in 150 ml. of benzene, the benzene solution is washed with water until neutral, separated, dried, and fractionated. In this manner, 12 grams of the ester with B.P. 82° C./0.01 mm. Hg are obtained. Yield 21% of the theoretical. The new ester is a water-insoluble colorless oil.

Calculated for molecular weight 225: S, 28.4%; P, 13.7%; N, 6.2%. Found: S, 26.9%; P, 12.8%; N, 6.3%.

Example 2

$$\begin{array}{c}C_2H_5O\\ \phantom{C_2H_5O}\diagdown\\ \phantom{C_2H_5O}P-S-CH_2-CH_2-CN\\ \phantom{C_2H_5O}\diagup\\ C_2H_5S\end{array}\quad\begin{array}{c}O\\ \|\\ \end{array}$$

54 grams (0.25 mol) of O.O.S-triethyl-thionophosphate are added dropwise at 80° C. with stirring to a solution of 25 grams of potassium ethyl mercaptide in 100 ml. of anhydrous alcohol. The reaction product is maintained at 80° C. for one hour, and 34 grams of β-bromopropionic acid nitrile are then added dropwise at about 70° C. with further stirring. The reaction product is maintained at 75–80° C. for one hour, and then placed into 200 ml. of ice-water. The separated oil is taken up in 200 ml. of benzene, washed with water until neutral, separated, and dried. On fractionation, there are obtained 39 grams of the new ester with B.P. 97° C./0.01 mm. Hg. Yield 65% of the theoretical. The ester is a water-insoluble colorless oil.

Calculated for molecular weight 239: S, 26.8%; P, 13.0%; N, 5.8%. Found: S, 25.9%; P, 12.8%; N, 5.5%.

Spider mites are killed completely with 0.01% solutions. The compound has an ovicidal activity. Systemic action with 0.1% solutions 100%. Caterpillars are killed completely with 0.1% solutions.

By exactly the same way but using instead of β-bromopropionic acid nitrile the equimolecular amount of chloroacetic acid ethyl ester there is obtained the compound of the following formula:

$$\begin{array}{c}C_2H_5O\\ \phantom{C_2H_5O}\diagdown\\ \phantom{C_2H_5O}P-S-CH_2-COOC_2H_5\\ \phantom{C_2H_5O}\diagup\\ C_2H_5S\end{array}\quad\begin{array}{c}O\\ \|\\ \end{array}$$

Example 3

$$\begin{array}{c}CH_3O\\ \phantom{CH_3O}\diagdown\\ \phantom{CH_3O}P-S-CH_2-CN\\ \phantom{CH_3O}\diagup\\ CH_3S\end{array}\quad\begin{array}{c}O\\ \|\\ \end{array}$$

43 grams (0.25 mol) of O.S-dimethyl-thiolphosphoric acid potassium salt are dissolved in 150 ml. of acetonitrile. 19 grams of α-chloro-acetonitrile are added at 40° C. with further stirring. The reaction product is kept at 40° C. for another hour and then worked up in the usual way. 20 grams of the new ester are thus obtained as a water-insoluble yellow oil which cannot be distilled even in a high vacuum. Yield 41% of the theoretical.

Aphids and spider mites are killed completely with 0.01% solutions. Caterpillars are killed completely with 0.1% solutions.

By exactly the same way but using instead of α-chloro-acetonitrile the equimolecular amount of α-chloro-propionic acid amide there is obtained the compound of the following formula:

$$\begin{array}{c}CH_3O\\ \phantom{CH_3O}\diagdown\\ \phantom{CH_3O}P-S-CH-CONH_2\\ \phantom{CH_3O}\diagup\phantom{P-S-}|\\ CH_3S\phantom{P-S-}CH_3\end{array}\quad\begin{array}{c}O\\ \|\\ \end{array}$$

If bromo-acetic acid monomethyl amide is reacted there is obtained the compound of the following formula:

$$\begin{array}{c}CH_3O\\ \phantom{CH_3O}\diagdown\\ \phantom{CH_3O}P-S-CH_2-CONH-CH_3\\ \phantom{CH_3O}\diagup\\ CH_3S\end{array}\quad\begin{array}{c}O\\ \|\\ \end{array}$$

Example 4

$$\begin{array}{c}C_2H_5O\\ \phantom{C_2H_5O}\diagdown\\ \phantom{C_2H_5O}P-S-CH_2-CH_2-N(C_2H_5)_2\\ \phantom{C_2H_5O}\diagup\\ C_2H_5S\end{array}\quad\begin{array}{c}O\\ \|\\ \end{array}$$

54 grams (0.25 mol) of O.O.S-triethyl-thionophosphate are added at 80° C., with stirring, to a solution of 25 grams of potassium ethyl mercaptide in 100 ml. of anhydrous alcohol. The temperature is maintained at 80° C. for one hour, and then 35 grams of β-chloro-ethyl diethylamine are added dropwise at 70° C. The reaction product is maintained at 75–80° C. for another hour and then worked up in the usual manner; 60 grams of the new ester of B.P. 88° C./0.01 mm. Hg, are thus obtained. Yield 85% of the theoretical. The new ester is a sparingly water-soluble colorless oil.

Calculated for molecular weight 285: N, 4.9%; S, 22.4%; P, 10.9%. Found: N, 4.5%; S, 21.9%; P, 10.7%.

Aphids are killed completely with 0.01% solutions. Spider mites are killed to 90% with 0.001% solutions. Systemic action with 0.1% solutions 100%.

Example 5

$$\begin{array}{c}CH_3O\\ \phantom{CH_3O}\diagdown\\ \phantom{CH_3O}P-S-CH_2-S-CH_2-S-P\\ \phantom{CH_3O}\diagup\phantom{P-S-CH_2-S-CH_2-S-P}\diagdown\\ CH_3S\phantom{P-S-CH_2-S-CH_2-S-P}SCH_3\end{array}\begin{array}{c}O\phantom{XXXXXXX}O\\ \|\phantom{XXXXXXX}\|\end{array}\begin{array}{c}\phantom{X}OCH_3\\ \diagup\end{array}$$

98 grams (0.5 mol) of O.S-dimethyl-thiolphosphoric acid potassium salt are dissolved in 250 ml. of acetonitrile; 33 grams of αα′-dichlorodimethyl sulfide are added dropwise at 80° C. with stirring. The temperature is maintained at 80° C. for another hour; the product is then cooled to room temperature and worked up in the usual manner. 31 grams of the new ester are thus obtained as a water-insoluble yellow oil. Yield 33% of the theoretical. The new ester cannot be distilled even in a high vacuum.

Aphids are killed completely with 0.01% solutions. Spider mites are killed completely with 0.001% solutions. Systemic action with 0.1% solutions 100%. Caterpillars are killed completely with 0.1% solutions.

By exactly the same way there may be obtained the compound of the following formula:

$$\begin{array}{c}CH_3O\\ \diagdown\\ P-S-CH_2-O-CH_2-S-P\\ \diagup\phantom{XXXXXXXXXXXXXXX}\diagdown\\ CH_3S\phantom{XXXXXXXXXXXXXXX}SCH_3\end{array}$$

Example 6

$$\begin{array}{c}CH_3O\\ \phantom{CH_3O}\diagdown\\ \phantom{CH_3O}P-S-CH_2-CH_2-CN\\ \phantom{CH_3O}\diagup\\ CH_3S\end{array}\quad\begin{array}{c}O\\ \|\\ \end{array}$$

49 grams (0.25 mol) of O.S-dimethyl-thiolphosphoric acid potassium salt are dissolved in 150 ml. of acetonitrile. 34 grams of β-bromopropionic acid nitrile are added at 80° C. with stirring. The reaction product is heated to 80° C. for an hour and then placed into water and worked up in the usual manner. 15 grams of the new ester are thus obtained as a sparingly water-soluble colorless oil of B.P. 82° C./0.01 mm. Hg. Yield 28% of the theoretical.

Spider mites are killed completely with 0.01% solutions. The compound has an ovicidal activity. Systemic action with 0.1% solutions 100%.

*Example 7*

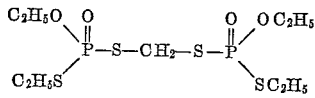

107 grams (0.5 mol) of O.O.S-triethyl thionophosphate are added at 80° C. with stirring to a solution of 50 grams of potassium ethyl mercaptide in 200 ml. of anhydrous alcohol. The mixture is maintained at 80° C. for one hour, and 44 grams of methylene bromide are then added dropwise at 70° C. with stirring. The reaction product is maintained at 75–80° C. for a further 2 hours and then worked up in the usual manner. 19 grams of the new ester are obtained as a water-insoluble yellow oil, which cannot be distilled even in a high vacuum. Yield 20% of the theoretical.

Calculated for molecular weight 384: S, 33.3%; P, 16.0%. Found: S, 32.8%; P, 15.7%.

*Example 8*

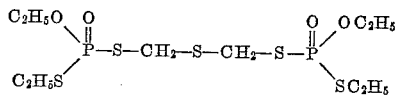

107 grams (0.5 mol) of O.O.S-triethyl-thionophosphate are added at 80° C. with stirring to a solution of 50 grams of potassium ethyl mercaptide in 200 ml. of anhydrous alcohol. The mixture is heated at 80° C. for one hour, and 33 grams of $\alpha,\alpha'$-dichloro-dimethyl sulfide are then added with further stirring. The reaction product is maintained at 80° C. for another hour, and then worked up in the usual manner. 67 grams of the new ester are obtained as a water-insoluble yellow oil. Yield 62% of the theoretical. The ester cannot be distilled even in a high vacuum.

Calculated for molecular weight 430: S, 27.2%; P, 14.4%. Found: S, 35.9%; P, 13.8%.

Aphids are killed completely with 0.01% solutions. Spider mites are killed to 80% with 0.001% solutions. Systemic action with 0.1% solutions 100%. Caterpillars are killed completely with 0.1% solutions.

*Example 9*

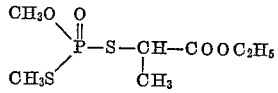

86 grams (0.5 mol) of O.O.S-trimethyl thionophosphate are added at 70° C. with stirring to a solution of 50 grams of potassium ethyl mercaptide in 200 ml. of methanol. The mixture is heated at 70° C. for one hour. 92 grams of $\alpha$-bromo-propionic acid ethyl ester are then added dropwise with further stirring and heating is continued at 70° C. for an hour. After working up as usual, 48 grams of the new ester of B.P. 66° C./0.01 mm.

Hg are obtained. Yield 37% of the theoretical. The ester is a water-insoluble colorless oil.

Calculated for molecular weight 258: S, 24.8%; P, 12.0%. Found: S, 23.9%; P, 12.8%.

Spider mites are killed to 80% with 0.01% solutions. Systemic action with 0.1% solutions 100%. Caterpillars are killed completely with 0.1% solutions.

I claim:
1. The compound of the following formula

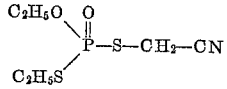

2. The compound of the following formula

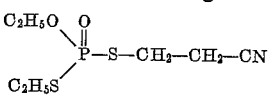

3. The compound of the following formula

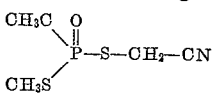

4. The compound of the following formula

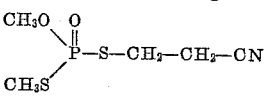

5. A thiophosphoric acid ester of the following formula

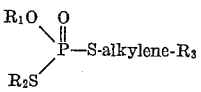

wherein $R_1$ and $R_2$ stand for alkyl radicals having up to 4 carbon atoms, $R_3$ stands for cyano; and alkylene stands for lower alkylene having up to 4 carbon atoms.

6. A compound of claim 5 wherein alkylene stands for a lower alkylene radical having 1 to 2 carbon atoms.

References Cited in the file of this patent
UNITED STATES PATENTS

| | | |
|---|---|---|
| 2,494,283 | Cassaday et al. | Jan. 10, 1950 |
| 2,494,284 | Cassaday et al. | Jan. 10, 1950 |
| 2,611,728 | Bartlett et al. | Sept. 23, 1952 |
| 2,736,726 | Gaetzi et al. | Feb. 28, 1956 |
| 2,767,206 | Whetstone et al. | Oct. 16, 1956 |
| 2,862,017 | Schrader et al. | Nov. 25, 1958 |
| 2,879,283 | Gaertner et al. | Mar. 24, 1959 |
| 2,881,201 | Schrader | Apr. 7, 1959 |
| 2,882,198 | Willard et al. | Apr. 14, 1959 |
| 2,884,354 | Christman | Apr. 28, 1959 |
| 2,885,430 | Scherer et al. | May 5, 1959 |
| 2,890,947 | Annable et al. | June 16, 1959 |
| 2,895,982 | Stiles | July 21, 1959 |
| 2,947,662 | Fusco et al. | Aug. 2, 1960 |

FOREIGN PATENTS

| | | |
|---|---|---|
| 791,824 | Great Britain | Mar. 12, 1958 |

OTHER REFERENCES

Dauterman et al.: "J. Agr. Food Chem.," vol. 8, pages 115–119 (March–April 1960).